United States Patent [19]
Brown et al.

[11] Patent Number: 5,939,341
[45] Date of Patent: Aug. 17, 1999

[54] NONWOVEN FABRIC LAMINATE

[75] Inventors: James Page Brown, Smyrna; Laura Elizabeth Keck, Alpharetta; Robert Leslie Hudson, Roswell, all of Ga.

[73] Assignee: Kimberly-Clark Worldwide, Inc., Neenah, Wis.

[21] Appl. No.: 08/907,241

[22] Filed: Aug. 6, 1997

Related U.S. Application Data

[63] Continuation of application No. 08/625,784, Mar. 29, 1996, abandoned, which is a continuation of application No. 08/257,248, Jun. 8, 1994, abandoned.

[51] Int. Cl.$^6$ ......................................................... B32B 5/26
[52] U.S. Cl. ........................... 442/351; 442/382; 442/400; 442/401; 428/903
[58] Field of Search ................................... 442/340, 351, 442/382, 400, 417; 428/903

[56] References Cited

U.S. PATENT DOCUMENTS

| | | | |
|---|---|---|---|
| 3,338,992 | 8/1967 | Kinney | 264/24 |
| 3,341,394 | 9/1967 | Kinney | 161/72 |
| 3,502,763 | 3/1970 | Hartmann | 264/210 |
| 3,523,809 | 8/1970 | Holbein . | |
| 3,542,615 | 11/1970 | Dobo et al. | 156/181 |
| 3,692,618 | 9/1972 | Dorschner et al. | 161/72 |
| 3,802,817 | 4/1974 | Matsuki et al. | 425/66 |
| 3,849,241 | 11/1974 | Butin et al. | 161/169 |
| 3,909,009 | 9/1975 | Cvetko et al. | 274/37 |
| 3,949,128 | 4/1976 | Ostermeier | 428/152 |
| 4,041,203 | 8/1977 | Brock et al. | 428/157 |
| 4,070,218 | 1/1978 | Weber | 156/167 |
| 4,183,768 | 1/1980 | Knapp et al. | 106/299 |
| 4,307,143 | 12/1981 | Meitner | 252/91 |
| 4,340,563 | 7/1982 | Appel et al. | 264/518 |
| 4,374,888 | 2/1983 | Bornslaeger | 428/198 |
| 4,493,370 | 1/1985 | Vrouenraets | 166/273 |
| 4,525,423 | 6/1985 | Lynn et al. | 428/421 |
| 4,581,406 | 4/1986 | Hedberg et al. | 524/520 |
| 4,707,398 | 11/1987 | Boggs | 428/224 |
| 4,863,785 | 9/1989 | Berman et al. | 428/218 |
| 4,923,914 | 5/1990 | Nohr et al. | 524/99 |
| 4,933,229 | 6/1990 | Insley et al. | 428/224 |
| 4,960,820 | 10/1990 | Hwo | 524/528 |
| 4,962,156 | 10/1990 | Shinjo et al. | 525/100 |
| 5,021,501 | 6/1991 | Ohmori et al. | 524/544 |
| 5,025,052 | 6/1991 | Crater et al. | 524/104 |
| 5,149,576 | 9/1992 | Potts et al. | 428/198 |
| 5,165,979 | 11/1992 | Watkins et al. | 428/113 |
| 5,169,706 | 12/1992 | Collier, IV et al. | 428/152 |
| 5,172,356 | 12/1992 | Kibune | 369/44.14 |
| 5,178,931 | 1/1993 | Perkins et al. | 428/198 |
| 5,178,932 | 1/1993 | Perkins et al. | 428/286 |
| 5,200,443 | 4/1993 | Hudson | 524/99 |
| 5,204,174 | 4/1993 | Daponte et al. | 428/286 |

FOREIGN PATENT DOCUMENTS

| | | |
|---|---|---|
| 0337662A2 | 10/1989 | European Pat. Off. . |
| 0516271A1 | 12/1992 | European Pat. Off. . |
| 91/08254 | 6/1991 | WIPO . |
| 93/06168 | 4/1993 | WIPO . |

OTHER PUBLICATIONS

Chimassorb 994FL—"Hindered Amine Light Stabilizer Use and Handling"—Ciba–Geigy.

Kimberly–Clark Corporation Evolution 4 fabric sales btochure—"Protect your car with a new 4–layer paint pillow" (1993).

*Primary Examiner*—Marion McCamish
*Assistant Examiner*—Elizabeth M. Cole
*Attorney, Agent, or Firm*—James B. Robinson

[57] ABSTRACT

There is provided a laminate of nonwoven fabrics for outdoor applications which has good resistance to ultraviolet light. The laminate has two meltblown layers sandwiched between spunbond layers to produce an SMMS laminate. The layers have a large amount of a UV stabilizer and metal oxide pigments. Such laminates are useful for car covers, awnings and canopies, etc. When the laminate is used as a car cover, it is preferred to skew the basis weights of the outer layers so that the layer against the car is significantly lighter than the other outer layer and to reduce the denier of the fibers in the layer against the car.

10 Claims, No Drawings

NONWOVEN FABRIC LAMINATE

This application is a continuation of application Ser. No. 08/625,784, now abandoned, entitled NONWOVEN FABRIC LAMINATE and filed in the U.S. Patent and Trademark Office on Mar. 29, 1996, which is a continuation of parent application Ser. No. 08/257,248, now abandoned, entitled NONWOVEN FABRIC LAMINATE and filed in the U.S. Patent and Trademark Office on Jun. 8, 1994. The entirety of the aforesaid applications are hereby incorporated by reference.

BACKGROUND OF THE INVENTION

Nonwoven fabrics are used for a wide variety of applications from baby wipes and diapers to automobile covers. These applications call for materials having diverse properties and attributes. Some applications, for example, call for nonwovens which are highly wettable, i.e. quickly allow liquids to pass through them, e.g. diapers and feminine hygiene products, while others require a high degree of repellency, e.g. outdoor fabrics like awnings and canopies. It is the latter class of products with which this invention is concerned, specifically, nonwoven materials which have barrier properties and which perform well when exposed to the elements in outdoor usage.

It has been found that the cause of much of the damage to outdoor materials, particularly those which are hydrocarbon based, is ultraviolet radiation or UV light.

It is therefore an object of this invention to provide a nonwoven laminate which will exhibit barrier performance superior to previous competitive materials in outdoor use and be resistant to UV light.

SUMMARY

The objects of the invention are provided by a four layer nonwoven laminate for outdoor applications having ultraviolet light stability. The first layer is a nonwoven web formed of continuous filaments having an average diameter of at least about 7 microns, prepared from a thermoplastic polymer which may be a polyolefin, polyester, polyamide, or a mixture of any of these, with a hindered amine ultraviolet light stabilizer additive in an amount of about 0.5 to 2.5 weight percent, and a metal oxide pigment in an amount of about 0.25 to 5 weight percent. The second layer is a nonwoven web formed of filaments having an average diameter of less than about 10 microns prepared from a thermoplastic polymer which may be a polyolefin, polyester, polyamide or a mixture of any of these, a hindered amine ultraviolet light stabilizer additive in an amount of about 0.25 to 2 weight percent, and a metal oxide pigment in an amount of about 0.25 to 5 weight percent. The third layer is substantially the same as the second layer. The fourth layer is a nonwoven web formed of continuous filaments having an average diameter of at least about 7 microns prepared from a thermoplastic polymer which may be a polyolefin, polyester, polyamide or a mixture of any of these, a hindered amine ultraviolet light stabilizer in an amount of about 0.5 to 2.5 weight percent, and a metal oxide pigment in an amount of about 0.25 to 5 weight percent. The four layers are bonded together to form a laminate.

DETAILED DESCRIPTION OF THE INVENTION

DEFINITIONS

As used herein the term "nonwoven fabric or web" means a web having a structure of individual fibers, filaments or threads which are interlaid, but not in an identifiable pattern such as occurs with traditional knitting and weaving processes. Nonwoven fabrics or webs have been formed from many processes such as for example, meltblowing processes, spunbonding processes, and bonded carded web processes.

As used herein the term "microfibers" means small diameter fibers having an average diameter not greater than about 50 microns, for example, having an average diameter of from about 0.5 microns to about 40 microns, or more particularly, microfibers may desirably have an average diameter of from about 2 microns to about 20 microns.

As used herein the term "spunbonded fibers" refers to small diameter fibers which are formed by extruding molten thermoplastic material as filaments from a plurality of fine, usually circular capillaries of a spinnerette with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. Nos. 3,502,763 and 3,909,009 to Levy, and U.S. Pat. No. 3,542,615 to Dobo et al. Spunbond fibers are generally continuous and larger than 7 microns, more particularly, between about 10 and 20 microns.

As used herein the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin. Meltblown fibers are microfibers which are generally smaller than 10 microns in diameter.

As used herein the term "polymer" generally includes but is not limited to, homopolymers, copolymers, such as for example, block, graft, random and alternating copolymers, terpolymers, etc. and blends and modifications of any of the foregoing. Furthermore, unless otherwise specifically limited, the term "polymer" shall include all possible geometrical configuration of the material. These configurations include, but are not limited to isotactic, syndiotactic and random symmetries.

As used herein, the term "machine direction" or MD means the length of a fabric in the direction that it is produced. The term "cross machine direction" or CD means the width of fabric, i.e. a direction generally perpendicular to the MD.

As used herein, the term "protective cover" means a cover for vehicles such as cars, trucks, boats, airplanes, motorcycles, bicycles, golf carts, etc., covers for equipment often left outdoors like grills, yard and garden equipment (mowers, roto-tillers, etc.) and lawn furniture, as well as floor coverings, table cloths and picnic area covers.

As used herein, the term "outdoor fabric" means a fabric which is primarily, though not exclusively, used outdoors. Outdoor fabric includes fabric used in protective covers, camper/trailer fabric, tarpaulins, awnings, canopies, tents, agricultural fabrics and outdoor apparel such as head coverings, industrial work wear and coveralls, pants, shirts, jackets, gloves, socks, shoe coverings, and the like.

TEST METHODS

Hydrohead: This test provides a measure of the liquid barrier properties of a fabric. The hydrohead test determines the height of water (in centimeters) which the fabric will support before a predetermined amount of liquid passes through. A fabric with a higher hydrohead reading indicates it has a greater barrier to liquid penetration than a fabric with a lower hydrohead. The hydrohead test is performed according to Federal Test Standard No. 191A, Method 5514.

Frazier Porosity: This test provides a measure of the breathability of a fabric and is performed according to Federal Test Standard No. 191A, Method 5450. Frazier Porosity measures the air flow rate through a fabric in cubic feet of air per square foot of fabric per minute or CSM. Convert CSM to liters per square meter per minute (LSM) by multiplying by 304.8. A higher Frazier Porosity indicates greater breathability.

Particle Filtration test: The Particle filtration test uses small latex spheres to simulate environmental particles as small as 0.1 micron. The desired size spheres are propelled toward an approximately 100 square inch circular piece of the test fabric at about 5 feet per minute and a counter (e.g., a HIAC/Royco model 8000A, 5109 or 1230 automatic particle counter) on the opposite side measures the number of particles which penetrate the fabric. Results are reported as percent filtration efficiency for removal of particles within the specified range and a higher number indicates relatively greater filtration efficiency.

Gardner Falling Weight Impact test: This test measures maximum impact prior to damage of a four pound weight onto a painted metal sheet covered by the fabric to be tested. The test measures inches of height above the panel to which the half inch diameter rod with a rounded point was raised prior to impact, and a higher reading indicates a relatively more protective fabric. This test is performed according to ASTM test method D-2794-84 and the results are reported in units of in-lb.

Paint Abrasion tests: This test is conducted using two methods; method A simulates a fabric moving across a painted surface with about 250 grams of weight on it. Method B simulates an outside force moving across the fabric over a painted surface. Paint abrasion is measured by evaluating changes in paint gloss of covered painted surfaces. Measurements are recorded at 60 degrees, which simulates viewing a panel horizontally. The testing reported herein was performed by Paint Research Associates of Ypsilanti, Mich.

Grab Tensile test: This test measures the pounds of force required to literally pull the fabric apart. Measurements are provided for the machine direction and cross machine direction.

Trap Tear test: This test measures the pounds of force required to propagate a tear.

Taber Abrasion test: This test measures the number of cycles required for an abrasion wheel to wear completely through the fabric.

MVTR: The MVTR of a fabric is water vapor transmission rate which gives an indication of how comfortable a fabric would be to wear. MVTR is measured in accordance with ASTM Standard Test Method for Water Vapor Transmission of Materials, Designation E-96-80 and the results are reported in grams/square meter/day.

South Florida test: This test is conducted by exposing the fabric to the sun with no backing in Miami, Fla. The samples face south at a 45 degree angle. Each cycle concludes with a modified tensile test in pounds to measure the degradation or change in strength of the fabric. This provides a measure of the durability of the fabric.

The field of nonwoven fabrics is a diverse one encompassing absorbent products such as diapers, wipes and feminine hygiene products and barrier products such as surgical gowns and drapes, and bandages. Nonwovens are also used for more durable applications such as protective covers and outdoor fabrics where resistance to the elements and to ultraviolet radiation are important features.

A nonwoven laminate has been developed by the inventors which has good wind resistance, water repellency, and durability upon prolonged exposure to sunlight.

The fibers from which the fabric of this invention is made may be produced by the meltblowing or spunbonding processes which are well known in the art. These processes generally use an extruder to supply melted thermoplastic polymer to a spinnerette where the polymer is fiberized. The fibers are then drawn, usually pneumatically, and deposited on a foraminous mat or belt to form the nonwoven fabric. The fibers produced in the spunbond and meltblown processes are microfibers as defined above.

The fabric of this invention is a multilayer laminate. An example of a multilayer laminate is an embodiment wherein some of the layers are spunbond and some meltblown such as a spunbond/meltblown/spunbond (SMS) laminate as disclosed in U.S. Pat. No. 4,041,203 to Brock et al., U.S. Pat. No. 5,169,706 to Collier, et al, and U.S. Pat. No. 4,374,888 to Bornslaeger. Such a laminate may be made by sequentially depositing onto a moving forming belt first a spunbond fabric layer, then a meltblown fabric layer and last another spunbond layer and then bonding the laminate in a manner described below. Alternatively, the fabric layers may be made individually, collected in rolls, and combined in a separate bonding step. Such fabrics usually have a basis weight of from about 6 to about 400 grams per square meter (gsm) or approximately 0.1 to 12 ounces per square yard (osy). (Note that the conversion from gsm to osy is to divide gsm by 33.91).

More particularly, the applicants have found that the barrier properties of a laminate having two meltblown layers, as opposed to one meltblown layer equal in basis weight to the two combined, are surprisingly superior. Therefore, the laminate of this invention is a fabric wherein some of the layers are spunbond and some meltblown as a spunbond/meltblown/meltblown/spunbond (SMMS) laminate. Such a laminate may be made by either method mentioned above and may have a basis weight of from 80 to 300 grams per square meter (2.4 to 8.8 osy) where the individual layers may have basis weights which vary from 15 to 135 gsm (0.4 to 4 osy) for the spunbond layers and from 5 to 40 gsm (0.1 to 1.2 osy) for the meltblown layers.

When the fabric of this invention is used as a car cover, it has been found advantageous to skew the basis weights of the outer layers wherein the outer layer closest to the car is of a lower basis weight than the other outer layer, or more particularly, where the layer closest to the car has a basis weight ranging from about 40 to 75% of the basis weight of the layer farthest from the car. It has also been found advantageous to use a lower denier fabric for the layer closet to the car as compared to the layer farthest from the car.

An example of the ranges of the basis weights of the layers of such a fabric are 68 to 105 gsm for the layer away from the surface of the car, 10 to 25 gsm for the inner layers of the laminate and 27 to 60 gsm for the layer against the car. Still more particularly, a car cover having, for example, an overall basis weight of 163 gsm (4.8 osy), may have layers with basis weights as follows, starting with the layer against the car: 44 gsm, 17 gsm, 17 gsm, 85 gsm (1.3 osy, 0.5 osy, 0.5 osy, 2.5 osy).

The lower denier of the inner layer and the skewing of the basis weights has been found to result in less abrasion of the surface of the car and therefore produce less loss in glossiness of the car paint after prolonged usage, as compared to a heavier basis weight layer against the car.

Nonwoven fabrics are generally bonded in some manner as they are produced in order to give them sufficient structural integrity to withstand the rigors of further processing into a finished product. Bonding can be accomplished in a number of ways such as hydroentanglement, needling, ultrasonic bonding, adhesive bonding and thermal bonding.

The fabric of this invention is preferably produced as four separate fabric layers which are individually thermally bonded as they are produced. This thermal bonding, a process known in the art, is done to a level sufficient to maintain the integrity of the layer through processing into the four layer laminate. More extreme thermal bonding of each layer could be performed but might cause an increase in the abrasiveness of the layers without materially improving the production process.

The four layers are brought together and bonded to produce the fabric of this invention. Ultrasonic bonding is the method preferred in this step and is performed, for example, by passing the fabric between a sonic horn and anvil roll as illustrated in U.S. Pat. No. 4,374,888 to Bornslaeger.

The thermoplastic polymers which may be used in the practice of this invention may be any known to those skilled in the art to be commonly used in meltblowing and spunbonding. Such polymers include polyolefins, polyesters and polyamides, and mixtures thereof, more particularly polyolefins such as polyethylene, polypropylene, polybutene, ethylene copolymers, propylene copolymers and butene copolymers and mixtures thereof.

The spunbond layers of the fabric of this invention are preferably polyolefin, more particularly polypropylene having a melt flow rate (MFR) of between 9 and 1000, and still more particularly between 9 and 100. The MFR is an indication of the viscosity of the polymer with a higher number indicating a lower viscosity. The MFR is expressed as the weight of material which flows from a capillary of known dimensions under a specified load or shear rate for a measured period of time and is measured in grams/10 minutes at 230° C. according to, for example, ASTM test 1238, condition E. It should be noted that the spunbond layers need not be spun from the same polymer. Suitable polypropylenes for the spunbond layers are commercially available as, for example, PF-301 and PF-305 from the Himont Corporation of Wilmington, Del.

The meltblown layers of the fabric of this invention are also preferably polyolefin, particularly polypropylene, and like the spunbond layers, need not be made from the same polymer. A polypropylene having an MFR of between 200 and 2000 would be suitable. Particularly suitable polypropylenes are PF-015 available from Himont or E5A75 from the Shell Chemical Company of Houston, Tex.

The spunbond and meltblown layers of the fabric of this invention have an additive to help protect the fabric from the effects of sunlight. This material is known as an ultraviolet (UV) stabilizer and may be added to the polymer prior to or during the melting of the polymer to produce the fibers. As such, it is an internal additive, as differentiated from a topically applied additive.

The UV stabilizer may be any of those known as hindered amines. Hindered amines are discussed in U.S. Pat. No. 5,200,443 to Hudson and examples of such amines are Hostavin TMN 20 from American Hoescht Corporation of Somerville, N.J., Cyasorb UV-3668 from American Cyanamid Company of Wayne, N.J. and Uvasil-299 from Enichem Americas, Inc. of New York. A particularly well suited hindered amine is that commercially available as Chimassorb® 944 FL from the Ciba-Geigy Corporation of Hawthorne, N.Y., and having CAS registry number 70624-18-9. The Chimassorb® 944 FL amine is incorporated into polypropylene pellets suitable for meltblowing by the Standridge Color Corporation of Social Circle, Ga., to produce a product which is commercially available under the designation SCC-8784.

The hindered amine light stabilizing material may be added to the layers at an amount of about 0.5 to 2.5 weight percent in the spunbond and about 0.25 to 2 weight percent in the meltblown. More particularly, the hindered amine may be present in an amount of between about 1 and 1.5 weight percent in the spunbond and about 1 weight percent in the meltblown.

The spunbond and meltblown layers of the fabric of this invention also have an additive to color the fabric and which also helps protect the fabric from the effect of ultraviolet light. This additive is known as a metal oxide pigment and is a particular class of pigments. This class of pigments is sometimes referred to as calcined metal oxides, complex metal oxides or calcined mixed oxides and are made by calcining the desired ingredients at temperatures from 1200 to 2300° F. This class of pigments, in addition to providing the expected coloration of the layers, also aids in protecting the material to which it is added from the damaging effects of ultraviolet light.

Example of metal oxides are titanium oxide and iron oxide. The iron oxides comprise a large number of compounds which can produce a large variety of colors in combinations with each other or other metal oxides. Information on such compounds may be found in *Chemical Additives for the Plastics Industry* by Noyes Data Corporation, 1987, published by Noyes Data Corporation of Mill Road, Park Ridge, N.J. 07656, Library of Congress Number 86-31155, at pages 48 and 49.

Various metal oxides are commercially available from a number of manufacturers in a number of colors. The pigments can be oxides which contain mixtures of cobalt (Co), aluminum (Al), chromium (Cr), titanium (Ti), iron (Fe), zinc (Zn), nickel (Ni), manganese (Mn), molybdenum (Mo), copper (Cu) and antimony (Sb), depending on the color desired. For example, a Co, Al oxide will produce blue, a Ni, Co, Zn, Ti oxide will produce green, a Ni, Sb, Ti oxide will produce yellow.

Suitable metal oxides are available from the Standridge Color Corporation of Social Circle, Ga.; the Sheperd Color Company, P.O. Box 465627, 4539 Dues Drive, Cincinnati, Ohio 45246 as "Inorganic Color Pigments"; the Ferro Corporation, Color Division, 4150 East 56th Street, P.O. Box 6550, Cleveland, Ohio, 44104 as "Inorganic Mixed Metal Oxide Pigments" or Mobay Chemicals (a Bayer USA Inc., Company), Inorganic Chemicals Division, Mobay Road, Pittsburgh, Pa. 15205-9741 as "Bayferrox Pigments".

The amount of metal oxide added to each layer varies between about 0.25 and 5 weight percent depending on the depth of color desired. The preferred range is from about 1 to 3 percent in each layer.

The layers of the fabric of this invention may also contain fire retardants for increased resistance to fire. Fire retardants for spunbond and meltblown thermoplastic polymers are known in the art and are internal additives. Other internal additives may also be present though it is preferred that the layers of the fabric of this invention be essentially free of internal fluorocarbon additives.

The fabric of this invention may also have topical treatments applied to it for more specialized functions. Such topical treatments and their methods of application are known in the art and include, for example, anti-static treatments and the like, applied by spraying, dipping, etc.

There are a number of features of a protective cover or outdoor fabric which are important in measuring the success of such materials:

The fabric should permit the escape of moisture trapped between it and the object the fabric is protecting in order to prevent damage to the object, yet the fabric should not allow liquid water to pass through to the object from the outside. These properties are measured by the Hydrostatic Head test, MVTR and the Frazier Porosity test.

The fabric should prevent airborne pollutants from reaching the object. This property is measured by the Particle Filtration test.

The fabric should provide some protection from impacts and not abrade the object. These properties are measured by the Gardner Falling Weight Impact test, the Paint Abrasion tests and the Taber Abrasion test.

The fabric should have sufficient strength so as to resist tears, rips and punctures through many uses. This property is measured by the Grab Tensile test, the Trap Tear test and the Taber Abrasion test.

The fabric should have good resistance to ultraviolet light. This property is measured by the South Florida test.

While all of the above properties are important, ultraviolet stability is regarded as the most critical since a lack of ultraviolet stability will result in a rapid breakdown of the fabric in outdoor use and loss of all other properties. A good balance of water repellency and breathability is also important. Different properties of the fabric are more or less desirable, of course, depending on the use to which the fabric is put.

It has been found that a laminate wherein the layers thereof have the above combination of ingredients provides ultraviolet stability of enhanced durability long sought in outdoor fabrics of this type as well as a good combination of the other properties mentioned above. The increased longevity of the fabric of this invention provides a cost savings for consumers.

The above mentioned characteristics of the fabric of this invention are illustrated by the examples below, results of the testing of which are given in Table 1. Note that Example 1 is an example of the fabric of this invention and the others are not. The units of the various test measurements are as given in the Test Methods section above if not given in the Table.

EXAMPLE 1

A laminate was produced comprising two meltblown layers of about 0.5 osy (17 gsm) each between two layers of spunbond material, one of about 2.5 osy (85 gsm) and the other of about 1.3 osy (44 gsm) for a final SMMS laminate with about a 4.8 osy (163 gsm) basis weight. The spunbond layers were both made from polypropylene designated PF-305 by the Himont Corporation of Wilmington, Del. The meltblown layers were both made from polypropylene designated PF-015 by Himont. Each layer of the laminate contained Ciba-Geigy Chimassorb® 944 FL hindered amine UV stabilizer in an amount of 1 weight percent in the meltblown layers and 1.25 weight percent in the spunbond layers. Each layer of the laminate further contained Standridge Color Corporation metal oxide pigment SCC-5181 in the spunbond layers in an amount of 2 weight percent, and in the meltblown layers in an amount of 2 weight percent. The layers were individually thermally bonded as produced and then combined and ultrasonically bonded together to produce the laminate.

EXAMPLE 2

Sunbrella® fabric from Glen Raven Mills Inc. of Glen Raven, N.C. was tested. Sunbrella® fabric is a modified acrylic or "modacrylic", woven fabric. The fibers are believed to be made from copolymers of acrylonitrile and a halogen containing monomer. The Sunbrella® fabric is topically treated with a fluorocarbon compound. The material tested was of about 8.7 osy (295 gsm).

EXAMPLE 3

Storm-gard® fabric from Guilford Mills was tested. This material had about a 4.8 osy (165 gsm) basis weight. Storm-gard® fabric is believed to be a polyester knit material coated with acrylic.

EXAMPLE 4

Tyvek® fabric from E.I. Dupont of Wilmington, Del. was tested. This material had about a 1.5 osy (50 gsm) basis weight. Tyvek® fabric is believed to be a high density polyethylene.

EXAMPLE 5

A poly-cotton imported fabric was tested. This material had a basis weight of 3.9 osy (130 gsm) and is believed to be a polyester-cotton woven fabric.

EXAMPLE 6

A laminate commercially available as Evolution® 3 fabric from Kimberly-Clark Corporation of Neenah, Wis. was produced tested. This material comprises two meltblown layers of about 0.6 osy (20 gsm) each between two layers of spunbond material of about 2 osy (68 gsm).

TABLE 1

| Example | Hydrohead | Frazier Porosity (CSM) | Percent Particle Filtration* | Gardner** Falling Weight (in) | Paint Abrasion A | Paint Abrasion B | Grab Tensile MD | Grab Tensile CD | Trap Tear MD | Trap Tear CD | Tabor Abrasion | MVTR | South Florida 6 mo. | South Florida 12 mo |
|---|---|---|---|---|---|---|---|---|---|---|---|---|---|---|
| 1 | 85 | 25 | 91 | 40 | 1000 | 1000 | 74 | 75 | 17 | 19 | 206 | 4300 | 81 | 77 |
| 2 | 42 | 3 | 79 | NA | NA | NA | 141 | 140 | NA | | 286 | 3900 | 100 | 100 |
| 3 | 66 | <1 | 65 | 30 | 200 | 1000 | 85 | 100 | 19 | 20 | 26 | 3200 | 19 | 11 |

TABLE 1-continued

| Example | Hydrohead | Frazier Porosity (CSM) | Percent Particle Filtration* | Gardner** Falling Weight (in) | Paint Abrasion | | Grab Tensile | | Trap Tear | | Tabor Abrasion | MVTR | South Florida | |
|---|---|---|---|---|---|---|---|---|---|---|---|---|---|---|
| | | | | | A | B | MD | CD | MD | CD | | | 6 mo. | 12 mo |
| 4 | >100 | <1 | 95 | 20 | 250 | 1000 | 25 | 33 | 8 | 13 | 45 | 2700 | 54 | 37 |
| 5 | 15 | 260 | 0 | NA | NA | NA | 84 | 70 | 22 | 15 | 52 | 4600 | NA | NA |
| 6 | 70 | 21 | 91 | 40 | NA | NA | 74 | 77 | 22 | 23 | 49 | 4300 | 69 | 58 |

*0.09 to 0.1 micron aerosol particles (IBR test E-215)
**An uncovered panel scores 20

It is clear from the preceding results that the sample of the fabric of this invention (Example 1) has a desirable and unique combination of attributes. It allows moisture to escape from the object to be covered yet keeps particles out. It maintains its barrier properties for a long period of time and protects covered objects from damage.

I claim:

1. A nonwoven laminate for outdoor applications having ultraviolet light stability comprising:
   a first layer of a nonwoven web formed of continuous spunbond filaments having a diameter of at least 7 microns and comprising a thermoplastic polymer selected from the group consisting of polyolefins, polyesters, polyamides, and mixtures thereof, a hindered amine ultraviolet light stabilizer in an amount between about 0.5 and 2.5 weight percent, and a calcined mixed oxide made by calcining desired ingredients selected from the group consisting of cobalt, aluminum, chromium, titanium, iron, zinc, nickel, manganese, molybdenum, and copper oxides wherein said calcined mixed oxide is present in an amount between about 0.25 and 5 weight percent, and;
   a second layer of a nonwoven web formed of meltblown filaments having a diameter of less than 10 microns and comprising a thermoplastic polymer selected from the group consisting of polyolefins, polyesters, polyamides and mixtures thereof, a hindered amine ultraviolet light stabilizer in an amount between about 0.25 and 2.0 weight percent, and a calcined mixed oxide made by calcining desired ingredients selected from the group consisting of cobalt, aluminum, chromium, titanium, iron, zinc, nickel, manganese, molybdenum, and copper oxides wherein said calcined mixed oxide is present in an amount of between about 0.25 and 5 weight percent, and;
   a third layer of a nonwoven web formed of meltblown filaments having a diameter of less than 10 microns and comprising a thermoplastic polymer selected from the group consisting of polyolefins, polyesters, polyamides and mixtures thereof, a hindered amine ultraviolet light stabilizer in an amount between about 0.25 and 2.0 weight percent, and a calcined mixed oxide made by calcining desired ingredients selected from the group consisting of cobalt, aluminum, chromium, titanium, iron, zinc, nickel, manganese, molybdenum, and copper oxides wherein said calcined mixed oxide is present in an amount of between about 0.25 and 5 weight percent, and;
   a fourth layer of a nonwoven web formed of continuous spunbond filaments having a diameter of at least 7 microns and comprising a thermoplastic polymer selected from the group consisting of polyolefins, polyesters, polyamides and mixtures thereof a hindered amine ultraviolet light stabilizer in an amount between about 0.5 and 2.5 weight percent, and a calcined mixed oxide made by calcining desired ingredients selected from the group consisting of cobalt, aluminum, chromium, titanium, iron, zinc, nickel, manganese, molybdenum, and copper oxides wherein said calcined mixed oxide is present in an amount of between about 0.25 and 5 weight percent;
   wherein said layers are bonded to form said laminate which has ultraviolet radiation stability.

2. The laminate of claim 1 wherein said thermoplastic polymers are polyolefins and said polyolefin is polypropylene.

3. The laminate of claim 1 wherein said first and fourth layers have basis weights between about 15 to 135 gsm and said second and third layers have basis weights between about 5 to 40 gsm.

4. The laminate of claim 3 wherein said fourth layer has a basis weight between approximately 40 to 75 percent of said first layer basis weight.

5. The laminate of claim 4 wherein said first layer has a basis weight of about 85 gsm, said second and third layers have basis weights of about 17 gsm and said fourth layer has a basis weight of about 44 gsm.

6. The laminate of claim 1 which is used as a protective cover.

7. The laminate of claim 6 wherein said protective cover is a car cover.

8. A protective cover for outdoor applications consisting essentially of:
   a first layer of a nonwoven web having a basis weight between 68 and 105 gsm and formed of continuous spunbond filaments having a diameter of at least 7 microns and comprising polypropylene, a hindered amine ultraviolet light stabilizer in an amount between about from 0.5 to 2.5 weight percent, and a calcined mixed oxide made by calcining a mixture of chromium, titanium, iron, and zinc oxides wherein said calcined mixed oxide is present in an amount between about 0.25 and 5 weight percent, and;
   a second layer of a nonwoven web having a basis weight between 10 and 25 gsm and formed of meltblown filaments having a diameter of less than 10 microns and comprising polypropylene, a hindered amine ultraviolet light stabilizer in an amount between about from 0.8 to 2.5 weight percent, and a calcined mixed oxide made by calcining a mixture of chromium, titanium, iron, and zinc oxides wherein said calcined mixed oxide is present in an amount between about 0.25 and 5 weight percent, and;
   a third layer of a nonwoven web having a basis weight between 10 and 25 gsm and formed of meltblown filaments having a diameter of less than 10 microns and comprising polypropylene, a hindered amine ultraviolet light stabilizer in an amount between about from 0.8 to 2.5 weight percent, and a calcined mixed oxide made by calcining a mixture of chromium, titanium, iron, and zinc oxides wherein said calcined mixed oxide is present in an amount between about 0.25 and 5 weight percent, and;

a fourth layer of a nonwoven web having a basis weight between 27 and 60 gsm and formed of continuous spunbond filaments having a diameter of at least 7 microns and comprising polypropylene, a hindered amine ultraviolet light stabilizer in an amount between about from 0.5 to 2.5 weight percent, and a calcined mixed oxide made by calcining a mixture of chromium, titanium, iron, and zinc oxides wherein said calcined mixed oxide is present in an amount between about 0.25 and 5 weight percent, and;

wherein said layers are ultrasonically bonded to form said laminate which has ultraviolet radiation stability.

9. The protective cover of claim 8 wherein said first layer has a basis weight of about 85 gsm, said second and third layers have basis weights of about 17 gsm and said fourth layer has a basis weight of about 44 gsm.

10. The cover of claim 9 wherein said fourth layer is made of filaments of a lower denier than said first layer filaments.

* * * * *